United States Patent [19]

Takahashi

[11] Patent Number: 5,459,582
[45] Date of Patent: Oct. 17, 1995

[54] VIDEO SIGNAL PROCESSING SYSTEM FOR TAKING INTO A MEMORY A SPECIFIED PICTURE EXTRACTED FROM MOVING IMAGES

[75] Inventor: Koji Takahashi, Kanagawa, Japan

[73] Assignee: Canon Kabushiki Kaisha, Tokyo, Japan

[21] Appl. No.: 267,582

[22] Filed: Jun. 29, 1994

Related U.S. Application Data

[63] Continuation of Ser. No. 112,641, Aug. 26, 1993, abandoned, which is a continuation of Ser. No. 619,768, Nov. 29, 1990, abandoned.

[30] Foreign Application Priority Data

Dec. 4, 1989 [JP] Japan .................................. 1-315565

[51] Int. Cl.$^6$ .................................................. H04N 5/76
[52] U.S. Cl. .................................................. 358/335
[58] Field of Search .................................. 358/335, 310, 358/906, 907; 300/33.1, 35.1

[56] References Cited

U.S. PATENT DOCUMENTS

| | | | |
|---|---|---|---|
| 4,456,931 | 6/1984 | Toyoda et al. ........................ | 358/906 |
| 4,604,668 | 8/1986 | Lemelson ............................. | 358/906 |
| 4,691,253 | 9/1987 | Silver .................................. | 360/33.1 |
| 4,714,966 | 12/1987 | Saito et al. ............................ | 358/906 |
| 4,758,883 | 7/1988 | Kawahara et al. .................... | 360/35.1 |
| 4,763,208 | 8/1988 | Kawamura et al. ................... | 360/33.1 |
| 4,802,019 | 1/1989 | Harada et al. ........................ | 360/33.1 |
| 4,827,347 | 5/1989 | Bell ..................................... | 358/909 |
| 4,837,628 | 6/1989 | Sasaki .................................. | 358/906 |
| 4,887,161 | 12/1989 | Watanabe et al. .................... | 358/906 |
| 4,901,160 | 2/1990 | Kinoshita et al. .................... | 358/906 |
| 4,937,676 | 6/1990 | Finelli et al. ......................... | 358/906 |
| 5,032,930 | 7/1991 | Suetaka et al. ....................... | 358/906 |
| 5,043,816 | 8/1991 | Nakano et al. ....................... | 358/906 |
| 5,050,003 | 9/1991 | Horii et al. ........................... | 358/906 |
| 5,091,787 | 2/1992 | Watanabe et al. .................... | 358/906 |
| 5,130,813 | 7/1992 | Oil et al. .............................. | 358/335 |

*Primary Examiner*—Donald McElheny, Jr.
*Attorney, Agent, or Firm*—Robin, Blecker, Daley & Driscoll

[57] ABSTRACT

A system facilitates a search operation and managing work on video signals having a numerous amount of information such as signals for moving images by removably mounting, on a video camera or a video signal recording device, a storage device for storing a specified picture or pictures included in the moving images. The system is arranged to extract the specified picture from the moving images for every given period of time, so that a video signal having a numerous amount of information can be searched without any difficulty.

36 Claims, 5 Drawing Sheets

COMPRESSION RATIO
C=1

VIDEO SIGNAL PROCESSING SYSTEM FOR TAKING INTO A MEMORY A SPECIFIED PICTURE EXTRACTED FROM MOVING IMAGES

This is a continuation application under 37 CFR 1.62 of prior application Ser. No. 08/112,641, filed Aug. 26, 1993, now abandoned which is a continuation application under 37 CFR 1.62 of prior application Ser. No. 619,768, filed Nov. 29, 1990, abandoned.

BACKGROUND OF THE INVENTION

1. Field of the Invention

This invention relates to a video signal processing system and more particularly to a system which is arranged to take into a memory a specified picture extracted from moving images.

2. Description of the Related Art

It has been known to write index marks or absolute addresses on a magnetic tape by a VTR and to perform a head search function by utilizing information on them in searching a program or a picture recorded on the tape. In this instance, the tape is moved forward at a high speed to a part where the desired program is recorded. Then, the operating mode of the VTR is switched over to a reproduction mode in response to detection of an applicable index mark or absolute address.

In accordance with the above-stated method, however, the contents of the record must be confirmed through head search signals by transporting the whole tape once. The camera-integrated VTR is arranged in these days to permit recording over such a long period of one or two hours. In other words, the conventional search method necessitates to transporting the tape from one end of tape to the other for the purpose of just confirming programs recorded in each tape cassette. Therefore, it has been quite troublesome to arrange many tape cassettes in order and to find desired records from among them.

SUMMARY OF THE INVENTION

Such being the background, it is a principal object of this invention to provide a system which simplifies and facilitates the management of video signals having a large amount of information such as moving images.

Under this object, a video signal processing system which is arranged as an embodiment of this invention comprises a video signal recording apparatus which has recording means for recording a video signal on a recording medium; and an external storage device which is removably mounted on the recording apparatus and is arranged to receive a specified picture extracted from the video signal to be recorded by the recording means and to be capable of storing video signals corresponding to a plurality of pictures.

Further, a video signal processing system which is also arranged according to this invention as another embodiment thereof comprises recording means for recording a video signal on a recording medium; extracting means for extracting a specified picture from the video signal to be recorded by the recording means, the extracting means being arranged to extract, when a period of time for which the recording means continues recording the video signal after the extracting means has extracted the specified picture exceeds a predetermined period of time, a subsequent specified picture; and storage means arranged to receive a video signal for the specified picture extracted by the extracting means and to be capable of storing video signals corresponding to a plurality of pictures.

The above and further objects and features of the invention will become apparent from the following detailed description of embodiments thereof taken in conjunction with the accompanying drawings.

DETAILED DESCRIPTION OF THE PREFERRED EMBODIMENTS

Figure 1:
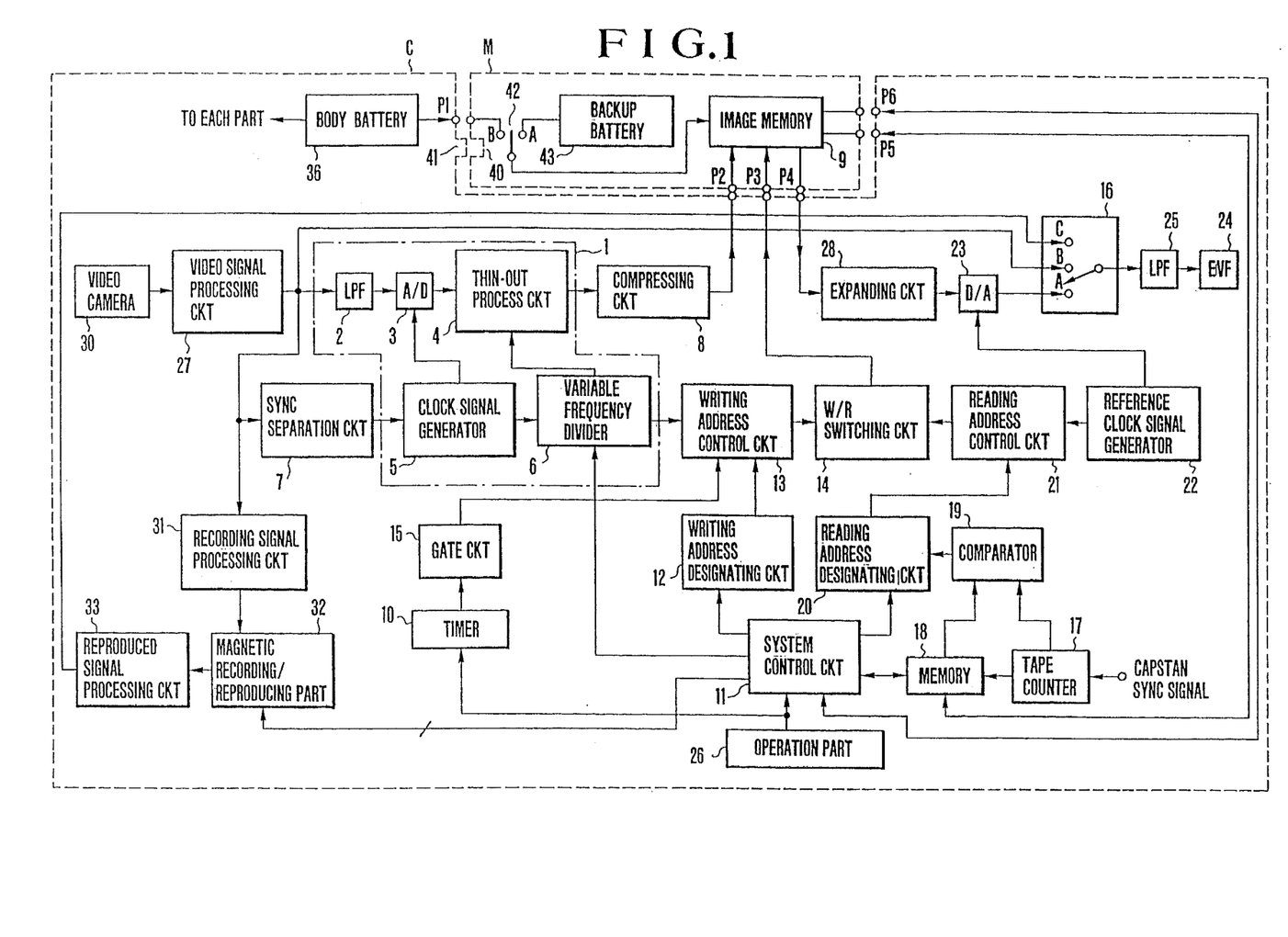
FIG. 1 is a block diagram showing the circuit arrangement of a system embodying this invention.

The details of an embodiment of this invention are described below with reference to the drawings:

FIG. 1 shows the circuit arrangement of a camera-integrated VTR which embodies this invention. The illustration includes a camera-integrated VTR body C and a memory pack M. A reference numeral 1 denotes a part performing an image contracting process. The image contracting process part 1 includes a low-pass filter (hereinafter referred to as LPF) 2; an analog-to-digital (hereinafter referred to as A/D) converter 3; a thin-out process circuit 4; a clock signal generator 5; and a variable frequency divider 6. A video signal which is output from a video camera 30 is processed by a video signal processing circuit 27. After this, the thin-out process circuit 4 of the image contracting process part 1 performs a process of thinning out picture elements to contract the image formed with the picture elements.

More specifically, the video signal which has been processed by the video signal processing circuit 27 into a signal conforming to a standard TV signal form is supplied to the image contracting process part 1 to have its frequency band limited by the LPF 2. The video signal from the LPF 2 is converted into a digital video signal by the A/D converter 3 in synchronism with a clock signal which is output from the clock signal generator 5. The digital video signal is supplied to the thin-out process circuit 4. At the thin-out process circuit 4, the picture elements in the horizontal direction are thinned out in accordance with one of compression ratios C (1, 2, 3, 4, . . . ) designated by a system control circuit 11 in synchronism with a timing signal coming from the variable frequency divider 6. Further, the lines of the digital video signal are likewise thinned out according to the compression ratio C designated. With the digital video signal thus thinned out according to the designated compression ratio C in synchronism with the timing signal from the variable frequency divider 6, a contracted image for one field is formed during each field period. In this case, the size of the picture remains unchanged if the compression ratio is 1. The picture size is reduced to ¼ of the area thereof if the compression ratio is 2; to ⅑ of the area if the ratio is 3; to 1/16 of the area if the ratio is 4; and is thus reduced to $1/c^2$ if the compression ratio C is c. The image of the reduced picture which is formed in this manner is output from the thin-out process circuit 4.

The clock signal generator 5 is arranged as follows: A horizontal synchronizing signal (hereinafter referred to as HD signal), a vertical synchronizing signal (hereinafter referred to as VD signal) and a color burst signal (hereinafter referred to as BURST signal) are obtained by separating them through a sync separation circuit 7 from the video signal output from the video signal processing circuit 27. The clock signal generator 5 forms a signal of a frequency which is, for example, 4 fs (fs: a color subcarrier frequency) by using the HD signal and the BURST signal. This signal is used as the clock signal for determining the sampling timing of the A/D converter 3.

A compressing circuit 8 uses high-efficiency coding means such as a known DPCM (differential PCM) or the like. The process of this DPCM is briefly described as follows: Video information is compressed to ½ by reducing the number of bits in such a way as to reduce a difference value (9 bits) of an 8-bit sample to 4 bits.

An image memory 9 which is disposed within the memory pack M is arranged to store the image data which is compressed and reduced by the image contracting process part 1 and the DPCM compressing circuit 8. An expanding circuit 28 is arranged to expand the image data which is stored in the image memory 9 in the compressed state.

A writing address designating circuit 12 is arranged to designate an image writing area on the image memory 8 in accordance with a predetermined order. A writing address control circuit 13 is arranged to shift the operating mode of a writing/reading (W/R) switching circuit 14 to a writing mode and to cause the compressed image data to be written into the image memory 9 in synchronism with the timing signal received from the variable frequency divider 6. A gate circuit 15 is arranged to inhibit the output of the writing address control circuit 13 from being produced while a timer 10 is operating. A selection switch 16 is arranged to selectively output a read signal coming from the image memory 9, the video signal coming from the video signal processing circuit 27 or a video signal coming from a reproduced signal processing circuit 33 which will be described later herein. When the switch 16 is connected to a terminal A thereof, the contracted picture stored in the memory 9 can be confirmed. When the switch 16 is connected to a terminal B thereof, the current moving image can be confirmed through the camera. When the switch 16 is connected to another terminal C, a moving image reproduced by the recorder can be confirmed.

A tape counter 17 is arranged to count a capstan synchronizing (hereinafter referred to as sync) signal and to produce information on the position of tape. A memory 18 is arranged to store the counted value of the tape counter 17 obtained every time a trigger switch provided on an operation part 26 is effectively pushed. A comparator 19 is arranged to compare the counted value of the tape counter 17 indicating the current tape position with a value of the memory 18 indicating the head part of a program recorded. A reading address designating circuit 20 is arranged to designate a reading address of the image memory 9 in accordance with the result of comparison made by the comparator 19. A reading address control circuit 21 is arranged to shift the operating mode of the W/R switching circuit 14 to a reading mode and to cause the contracted image data to be read out from the image memory 9 in accordance with the address designated by the reading address designating circuit 20. This reading action is performed in synchronism with a clock signal output from a reference clock signal generator 22.

A digital-to-analog (D/A) converter 23 is arranged to convert into an analog signal the contracted digital image data read out from the image memory 9 after the digital image data is DPCM-decoded and to supply the analog signal to the input terminal A of the selection switch 16. A reference numeral 24 denotes a monitor which is a CRT or a so-called electronic viewfinder (hereinafter referred to as EVF) using a liquid crystal or the like. The EVF 24 is arranged to display an image on the basis of the analog signal which is obtained from the D/A converter 23 and is output from an LPF 25 via the selection switch 16. The operation part 26 is provided with an operation panel for designating various modes and includes besides the above-stated trigger switch a stop switch STOP, a reproduction switch PLAY, a recording switch REC, a still picture switch STILL, a pause switch RECPAUSE, a fast forwarding switch FF, a rewinding switch REW, etc.

A recording signal processing circuit 31 is arranged to process the video signal coming from the video signal processing circuit 27 by performing various processes, such as frequency modulation, etc., for bringing the video signal into a signal form suited for magnetic recording. The output of the circuit 31 is supplied to a magnetic recording/reproducing part 32. The magnetic recording/reproducing part 32 is controlled by the system control circuit 11 in accordance with an operation performed on each of the switches of the operation part 26. The part 32 performs recording when the camera-integrated VTR is set in a recording mode and reproduction when the VTR is set in a reproduction mode.

Figure 2A:
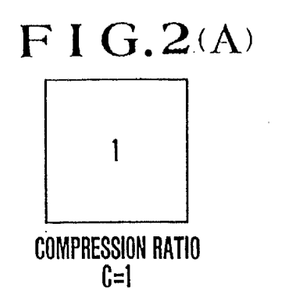
FIGS. 2(A), 2(B) and 2(C) show image data allocated within the storage areas of an image memory shown in FIG. 1.
Figure 2B:
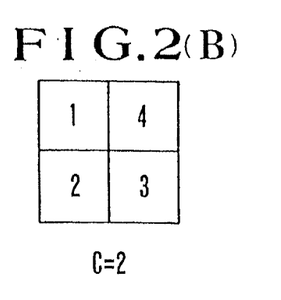
Figure 2C:
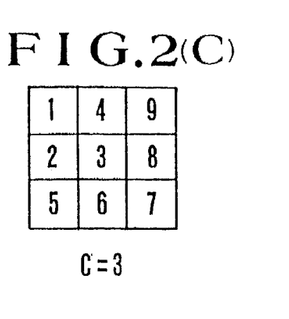

FIGS. 2(A), 2(B) and 2(C) show by way of example practical allocation of image data within the memory 9 of FIG. 1. When the compression ratio C is set at 1, the video signal is not contracted and is stored in a field memory of the image memory 9 as it is, as shown in FIG. 2(A). In a case where two, three or four pictures are to be stored, the compression ratio C is set at 2. In this case, the image data is reduced to ½ both in the horizontal and vertical directions before it is stored in the above-stated field memory, as shown in FIG. 2(B). If the number of pictures to be stored is from 5 through 9, the compression ratio C is set at 3. In that case, the image data is reduced to ⅓ both in the horizontal and vertical directions before it is stored in the field memory, as shown in FIG. 2(C). The compression ratio C is set at 4 when the number of pictures to be stored is from 10 through 16 and set at 5 if the number of pictures to be stored is from 17 through 25. The compression ratio C in this manner varies with the number of pictures to be stored in the memory. If the compression ratio C is arranged to be unvarying, the picture quality would be fixed. Whereas, in the case of this embodiment of the invention, the compression ratio is arranged to be variable with the number of pictures, so that a good picture quality can be obtained in cases where only a small number of pictures are to be stored.

Figure 3A:
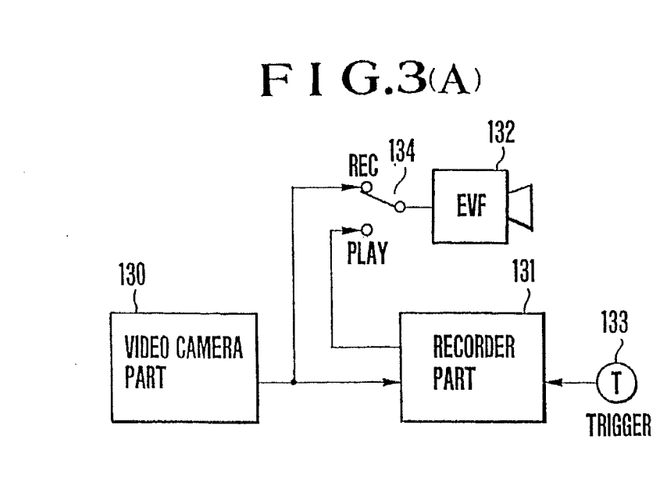
FIG. 3(A) schematically shows arrangement generally employed for the conventional video system.

FIG. 3(A) shows in outline a basic arrangement generally employed for a video system. The video system comprises a video camera part 130; a recorder part 131, an EVF (electronic viewfinder) 132 and a trigger button 133. An image input to the EVF 132 is arranged to be selectable by means of a selection switch 134. In other words, the position of the switch 134 is set on one side REC thereof in selecting a recording mode and is on the other side PLAY in selecting a reproduction mode. In recording, a video signal obtained at the video camera part 130 is supplied to the EVF 132. In reproducing, a reproduced video signal obtained by the recorder part 131 is supplied to the EVF 132.

Figure 3B:
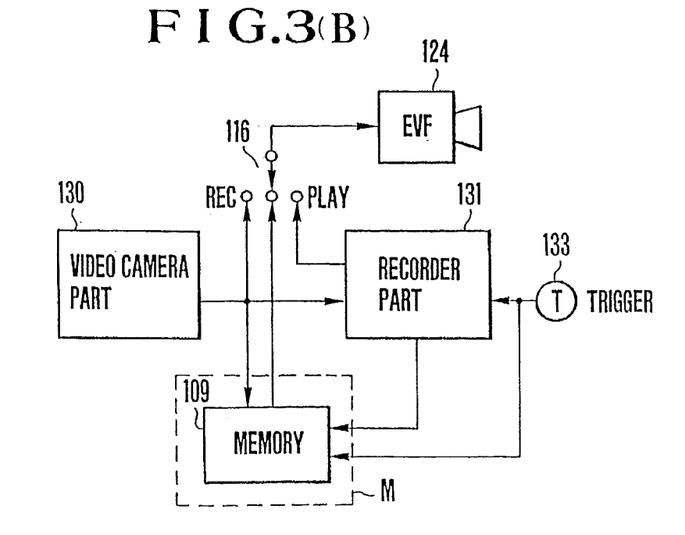
FIG. 3(B) schematically shows the video system arrangement of the embodiment of the invention shown in FIG. 1.

FIG. 3(B) schematically shows by way of example the arrangement of the video system which is shown in FIG. 1 as an embodiment of this invention. This video system comprises a video camera part 130, a recorder part 131, an EVF 124, a trigger button 133 and an image memory 109. The embodiment differs from the conventional system shown in FIG. 3(A) in that the video signal from the video camera part 130 is arranged in this case to be stored in the image memory 109 when the trigger button 133 is effectively pushed. Further, the input to the EVF 124 is arranged to be selected by a selection switch 116 in such a way as to permit monitoring each of the video signals output from the video camera part 130, from the recorder part 131 and from the memory 109 respectively by using the EVF 124.

Figure 4A:
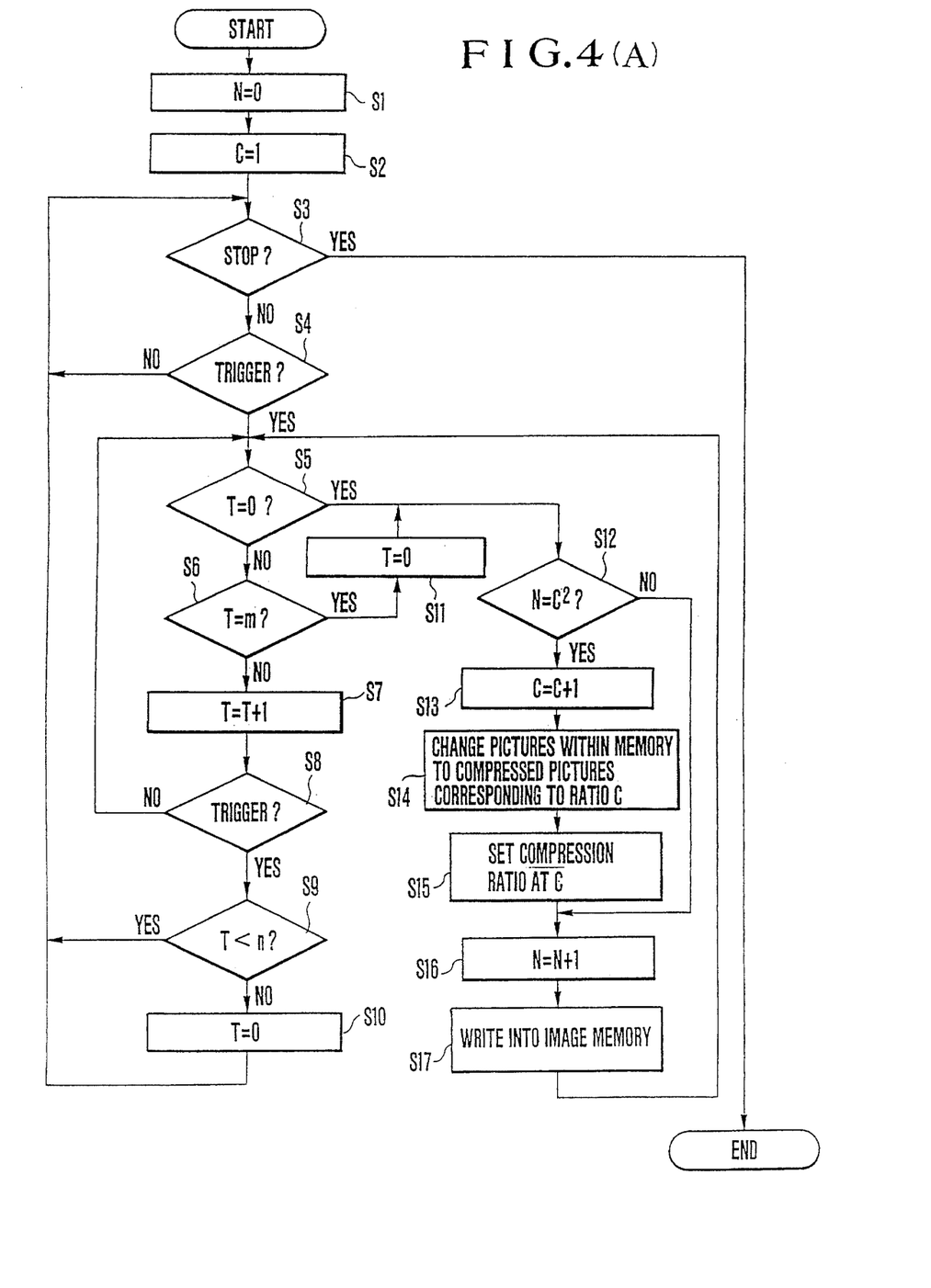
FIGS. 4(A) and 4(B) are flow charts showing the operating procedures of a system control circuit shown in FIG. 1 for writing and reading into and from the memory.
Figure 4B:
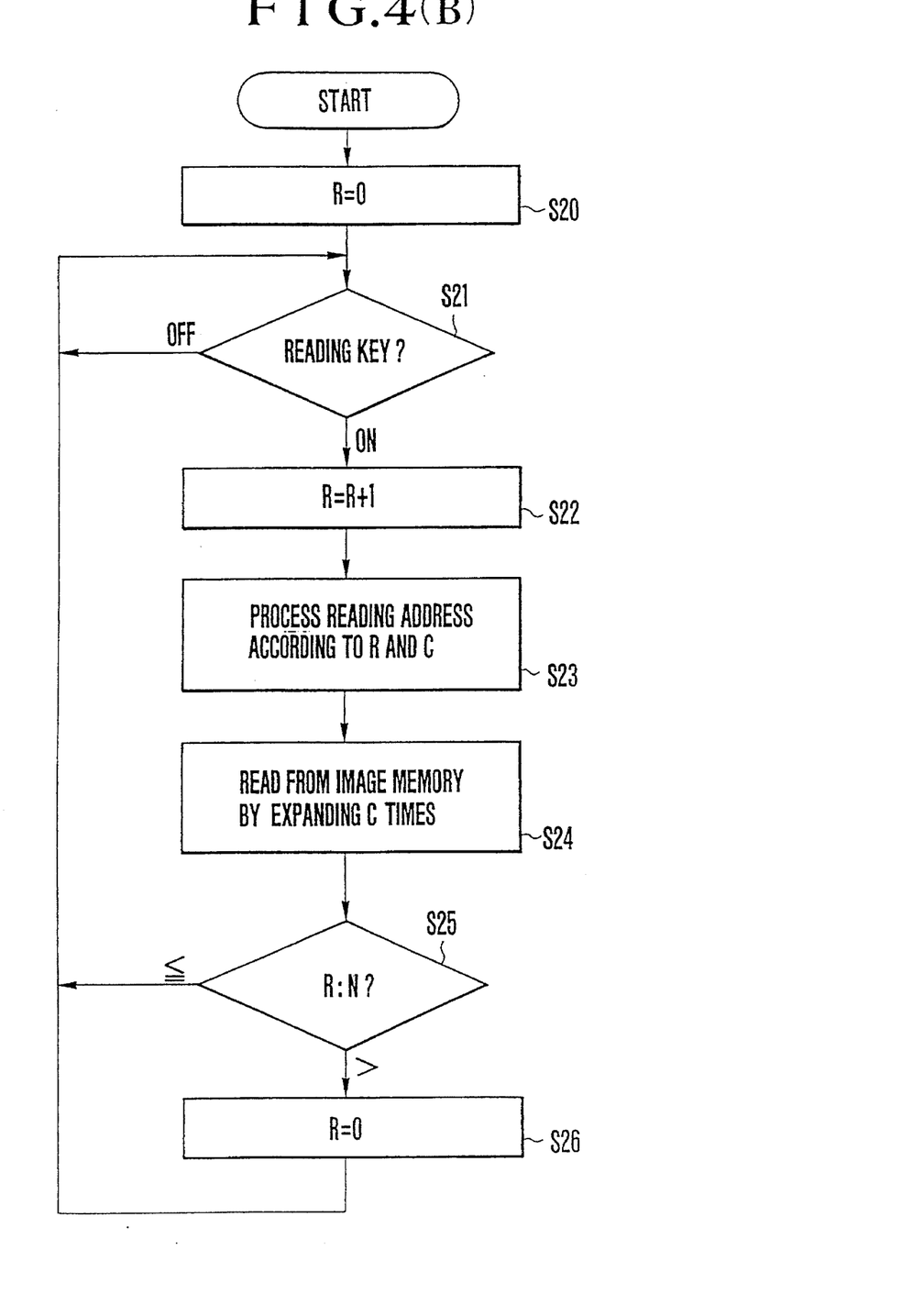

FIGS. 4(A) and 4(B) show the operation procedures to be executed by the system control circuit 11 of this embodiment. The flow of operation for writing into the memory 9 is described as follows with reference to FIG. 4(A):

At a step S1, after tape loading: A variable N indicating the number of times for which images are written into the memory 9 is cleared. At a step S2: The compression ratio C to be set for contracting the data of image memory 9 is initialized by setting it at 1.

The VTR then comes to be in a standby state. If a tape cassette ejecting instruction is issued by operating a tape eject key at a step S3 under this standby state, the tape is ejected and the flow comes to an end. If the trigger key is pushed at a step S4 in the standby state, the VTR is set into the recording mode and the flow of operation proceeds to a step S5.

At the step S5: The timer 10 is checked to find if the counted value T of the timer 10 is zero. If not, the flow proceeds to a step S6. At the step S6: The time counted value T is checked to find if it has reached a given value m. If the counted value T is found to be neither zero nor m, the flow comes to a step S7. At the step S7: The counted value T of the timer 10 is incremented. If the trigger key is again operated in the recording mode, the flow comes to a step 9. If the time counted value T is determined to be a given value n or more at the step S9, the time counted value T is reset to zero and the VTR comes back to the standby state at a step S10. If the time counted value T is determined to be less than the given value n at the step S9, the VTR comes back to the standby state while keeping the time counted value T unchanged.

This is because the flow shifts to a process of writing into the memory to be executed at a step S12 and steps subsequent thereto which will be described later if the time counted value T is determined to be zero at the step S5. In other words, in a case where the length of a recorded program is less than a period corresponding to the given value n, it is useless to store image data in the memory 9. Therefore, in the case of the system of this embodiment, writing image data into the memory 9 at the start of recording is inhibited if the recording time of a program recorded immediately before the start is short. However, since the time counted value T is retained, image data is written into the memory 9 at a next start of recording if a total length of recording time of a plurality of programs exceeds the period corresponding to the given value n. Conversely, in a case where a single program is extremely long, the time counted value T is reset at zero at the step S11 when the time counted value T is determined to exceed the given value m at the step S6. Then, the flow comes from the step S11 to the image writing process to be executed at the step S12 and steps following it. In short, in this instance, pictures taken are automatically written into the memory 9 at intervals of a given period of time.

The process of writing image data into the memory 9 by the steps beginning with the step S12 is described as follows: At the step S12: The number of times N for which image data is written into the memory 9 is compared with a value C obtained by squaring the value of the compression ratio C. When these two values come to coincide with each other, the flow proceeds to a step S13. More specifically, the values 1, 4, 9, 16, ... of the number of times N respectively coincide with the values 1, 2, 3, 4, ... of the compression ratio C. If the value N fails to coincide with the value $C^2$, the flow of operation comes to a step S16. At the step S13, the compression ratio C is incremented by one. At a next step S14: All the pictures stored in the image memory 9 are again compressed to contracted images corresponding to the compression ratio C incremented. At a step S15: The compression ratio of the contracting process part 1 is set at the value C.

At a step S16: The number of times N for writing the image data is incremented by one. At a next step S17: The contracted image data obtained from the contracting process part 1 is written into the address area designated by the writing address designating circuit 12.

Next, referring to FIG. 4 (B), a procedure for reading out the image data written in the image memory 9 is described as follows: At a step S20 after the power is turned on, a reading serial number R for reading the image data out from the image memory 9 is initialized by resetting it at zero. At a next step S21: A check is made to find if a reading key provided on the operation part 26 is pushed. If the reading key is found to have been pushed, the flow comes to a step S22 to proceed to reading the contents of the image memory 9 in the following manner:

At the step S22: The value of the reading serial number R is incremented by one. At a next step S23: According to the image compression ratio C and the reading serial number R, a process of determining a reading address within an applicable area of the image memory 9 is performed by using the reading address designating circuit 20, the reading address control circuit 21 and the W/R switching circuit 14. At a step S24: The image data is read out from the area of the image memory 9 while the expanding circuit 28 expands information according to the image compression ratio C.

At a next step S25: The number N of pictures stored within the image memory 9 is compared with the reading serial number R. If the value R is found to be larger than the value N, the flow comes to a step S26. If the value R is equal to or smaller than the value N, the flow comes back to the step S21. At the step S26: The reading serial number R is initialized by resetting it at zero. After that, the flow of operation comes back to the step S21. Therefore, the image reading process is performed by repeating the serial change of the reading serial number R in such a way as 1, 2, ... ; N, 1, 2, ....

Figure 5A:
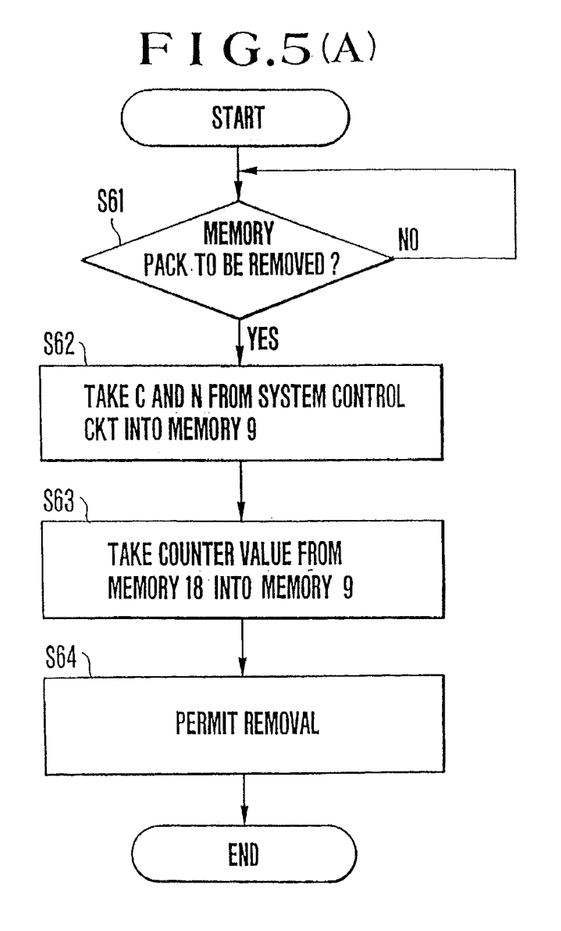
FIGS. 5(A) and 5(B) are flow charts showing memory pack removing and mounting operations of the system shown in FIG. 1.
Figure 5B:
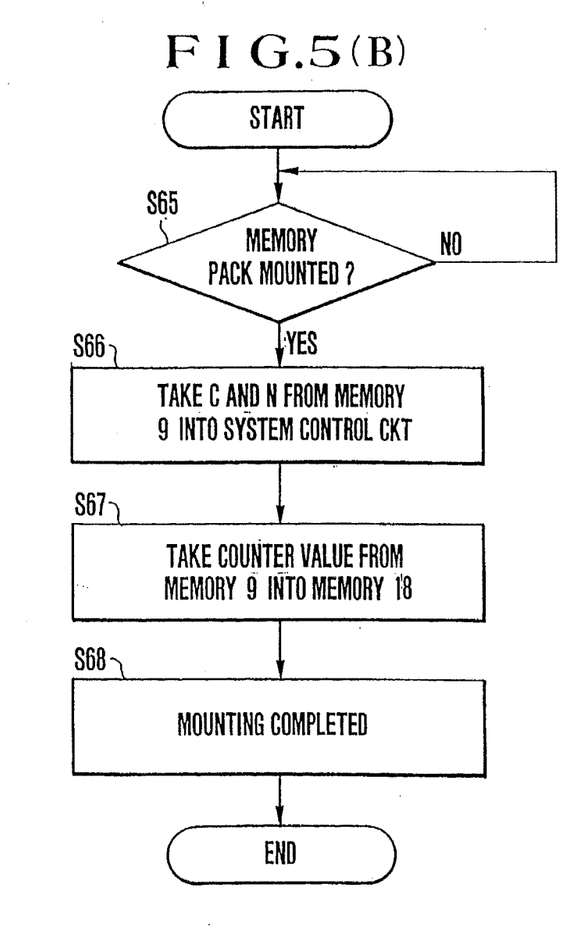

Referring to FIG. 1 and FIGS. 5(A) and 5(B), a procedure for replacing the memory pack M is described as follows: The memory pack M and the camera-integrated VTR are provided respectively with a recessed part 40 and a protruding part 41 for detection of mounting of the memory pack on the VTR. They are electrically interconnected by means of contacts P1 to P6 which are arranged between them. The connecting position of a switch 42 which is provided within the memory pack M is shifted on one side B thereof when the recessed part 40 is fitted on the protruding part 41. Then, the electric energy from a battery 36 which is disposed on the side of the body C of the VTR is applied to the memory 9. When the memory pack M is removed from the VTR body C, the position of the switch 42 is shifted to the other side A thereof. A backup battery 43 which is provided within the memory pack M for the purpose of retaining data supplies the memory 9 with power. A reference symbol P1 denotes a contact for power supply; a symbol P2 a contact for giving and receiving compressed image data; a symbol P3 a contact for control over writing and reading into and from the memory 9; a symbol P4 a contact for giving and receiving image data read out from the memory 9; a symbol P5 a contact for giving and receiving a counter value; and a symbol P6 a contact for giving and receiving the compression ratio C between the system control circuit 11 and the memory 9.

Referring to FIG. 5(A), the memory pack removing operation of the system is described as follows: Upon confirmation of an instruction for removal of the memory pack M at a step S61, the flow of operation comes to a step S62. At the step S62, the compression ratio C and the value N of the number of image writing times are taken into the memory 9 from the system control circuit 11. Next, at a step S63, the counter value is taken into the memory 9 from the memory 18. At a step S64, permission is given for actual removal.

Next, in mounting the memory pack M on the VTR body C, the VTR body C operates as described below with reference to FIG. 5(B):

Upon confirmation of mounting of the memory pack M at a step S65, the flow comes to a step S66. At the step S66: The compression ratio C and the value N of the number of image writing times are sent from the memory 9 to the system control circuit 11. At a next step S67: The counter value is sent from the memory 9 to the memory 18. At a step S68: Completion of mounting of the memory pack M is confirmed by the whole system.

With the embodiment arranged to permit the image memory to be replaceable as described in detail in the foregoing, the image memory and the tape can be adequately correlated with each other. Therefore, retrieval pictures can be adequately formed without difficulty even in cases where the tape is replaced during the process of shooting.

Further, the image memory can be prepared in the form of a so-called IC card or the like. In that case, the tape can be paired with the IC card in storage. Such arrangement greatly facilitates confirmation of the contents of each record on the tape. Further, the amount of data can be curtailed as desired by the provision of the image contracting process part and the image information compressing and expanding circuits. Therefore, the image memory can be allowed to have a small capacity, so that the amount of backup current required for the image memory is lessened. These advantages enable the image memory to be replaceable in a compact system.

The embodiment described is arranged to contract the input image data to permit writing the contracted data into the image memory every time the trigger button on the operation part of the video camera is pushed; and to expand the image data back to the size of the original image in reading it out from the image memory. By virtue of this arrangement, the head image of each scene can be displayed on the monitor to facilitate a retrieval process for the images recorded. This is a great help to editing work on images.

Besides, since the image data is correlatable with the tape counted value, the head part of each scene can be clearly located to further facilitate the editing work.

Compared with prices in former times, the price of the semiconductor memory to be employed as the image memory has become cheaper. However, a great amount of information is occupying the memory per image. If, in view of this, the storage area of the image memory is invariably divided into a fixed number of areas from the beginning for effective use of the image memory, the amount of recordable information decreases to lower the quality of picture accordingly as the area is divided into a greater number of areas. Whereas, in the case of the embodiment described, the dividing number is arranged to be increasable accordingly as the number of pictures to be stored in the image memory increases. This arrangement enhances the picture quality in cases where only a few pictures are to be stored.

However, since the capacity of the image memory is fixed, the number of pictures would increase to degrade the picture quality if the trigger button is frequently pushed. To solve this problem, the embodiment described is arranged to inhibit writing into the image memory in a case where the trigger button is pushed at intervals of time shorter than a given value.

A further advantage of the embodiment resides in that the image data is taken into the memory at predetermined time intervals even in the case of continuous shooting over a long period of time, so that the retrieval picture can be adequately formed.

Further, the previous state of shooting can be confirmed not only at the time of editing but also during the process of shooting. Therefore, shooting a duplicate or useless scene can be prevented and a necessary scene also can be prevented from being omitted.

The video signal processing system according to this invention, as described in the foregoing, facilitates the confirming and searching operations on the contents of records on a recording medium. This gives a great advantage in the management of many recording media.

What is claimed is:

1. A moving image processing system comprising:
   a) a moving image signal recording apparatus having recording means for recording a moving image signal on a recording medium;
   b) extracting means for extracting a still image from said moving image signal to be recorded by said recording means in response to a start of recording of said moving image signal by said recording means;
   c) compressing means for compressing the still image extracted by said extracting means; and
   d) an external storage device which receives the still image compressed by said compressing means and is able to store still images corresponding to a plurality of pictures, said external storage device being removably attached to said recording apparatus.

2. A system according to claim 1, further comprising writing control means for determining the timing of writing said still image into said external storage device.

3. A system according to claim 2, wherein said writing control means is disposed within said recording apparatus.

4. A system according to claim 2, wherein said writing control means includes inhibiting means for inhibiting an extracting operation in a case where an interval between successive recordings of said moving image signal by said recording apparatus is shorter than a predetermined period of time.

5. A system according to claim 1, wherein said extracting means extracts said still image in response to a continuation of recording said moving image signal by said recording apparatus beyond a predetermined period of time.

6. A system according to claim 1, wherein said compressing means includes thin-out means for thinning out numerous picture elements of said still image at a predetermined thin-out rate and for outputting the still image thinned-out by said thin-out means.

7. A system according to claim 6, wherein said thin-out means is able to change said thin-out rate according to a number of said still images to be stored in said storage device.

8. A system according to claim 1, wherein said compressing means includes high-efficiency coding means for compressing each of numerous picture elements of said still image.

9. A system according to claim 1, further comprising a video camera for generating said moving image signal to be recorded by said recording apparatus.

10. A system according to claim 9, wherein said recording apparatus incorporates said video camera therein.

11. A system according to claim 10, further comprising display means for displaying an image corresponding to said moving image signal from said external storage device.

12. A video signal processing system, comprising:
 a) a video camera comprising: image pickup means for picking up an image of an object and outputting a moving image signal;
  recording means for recording the moving image signal from said image pickup means on a recording medium;
  compression and extraction means for extracting and compressing a still image from the moving image signal to be recorded by the recording means in response to a start of recording of the moving image signal by the recording means, and
 b) an exterior memory device which memorizes the still image extracted by the extraction means and has a capacity to memorize the still image for a plurality of pictures, said exterior memory device being removably attached to the video camera.

13. A system according to claim 12, wherein said video camera further has reproducing means for reproducing the moving image signal from the recording medium, and reading means for reading out the still image from the memory device.

14. A system according to claim 12, further comprising a display device which displays an image corresponding to the moving image reproduced by the reproducing means and the still image read out by the reading means.

15. A moving image processing system comprising:
 a) a recording device comprising:
  a moving image signal recording apparatus having recording means for recording a moving image signal on a recording medium;
  extracting means for extracting a still image from said moving image signal to be recorded by said recording means in response to a start of recording of the moving image signal by said recording means; and
 b) an exterior memory device which receives the still image compressed by said compressing means and is able to store still images corresponding to a plurality of pictures, said external storage device being removably attached to said recording apparatus.

16. A system according to claim 15, wherein said recording device has reproducing means for reproducing the moving image signal from the recording medium and reading means for reading out the still image from the memory device.

17. A system according to claim 16, further comprising a display device which displays an image corresponding to the moving image reproduced by the reproducing means and the still image read out by the reading means.

18. A video signal processing apparatus, comprising:
 a) image pickup means for picking up an image of an object and outputting a video signal;
 b) first storage means for storing the video signal from said image pickup means;
 c) extracting means for extracting a specific image signal from said video signal to be stored in said first storage means;
 d) compressing means for compressing said specific image signal extracted by said extracting means at a predetermined compressing ratio;
 e) second storage means for storing said specific image signal compressed by said compressing means, said first storage means having a capacity larger than that of said second storage means;
 f) first reading means for reading out the video signals from the first storage means;
 g) second reading means for reading out the specific image signals;
 h) selection means for selectively outputting the video signal output from the image pickup means, the video signal read out by the first reading means and the specific image signal read out by the second reading means; and
 i) display means for displaying an image corresponding to the signal selected by the selection means.

19. An apparatus according to claim 18, wherein said second storage means is detachable from said apparatus.

20. An apparatus according to claim 19, further comprising A/D converting means for converting said specific image signal into a digital image signal,
 wherein said compressing means is arranged to compress the digital image signal fed from said A/D converting means and said second storage means is arranged to store the digital image signal fed from said means.

21. An apparatus according to claim 20, further comprising changing means for changing a compressing ratio of said compressing means in response to a number of said specific image signals stored in said second storage means.

22. An apparatus according to claim 18, wherein said first storage means includes a magnetic tape and said second storage means includes an IC card.

23. An apparatus according to claim 18, wherein said compressing means includes thin-out means for thinning out numerous picture elements of said specific image signal extracted by said extracting means at a predetermined thin-out rate and for outputting the still image signal thinned-out by said thin-out means.

24. A video signal processing apparatus, comprising:
 a) recording means for recording video signal on a recording medium;
 b) extracting means for extracting a specific image signal from the video signal to be recorded by said recording means, said extracting means in response to start of recording of the video signal by said recording means;
 c) compressing means for compressing the specific image signal extracted by said extracting means at a predetermined compressing ratio; and d) storage means for storing the specific image signal compressed by said compressing means and having a capacity for storing specific image signals corresponding to a plurality of pictures;

e) reading means for reading out said specific image signals from said storage means; and f) expanding means for expanding the specific image signal read out from said storage means at a predetermined expanding ratio on the basis of the compressing ratio of said compressing means.

25. An apparatus according to claim 24, wherein said storage means is detachable from said apparatus.

26. An apparatus according to claim 24, further comprising changing means for changing a compressing ratio of said compressing means according to a number of specific image signals stored in said storage means.

27. An apparatus according to claim 24, further comprising a video camera for generating said video signal.

28. An apparatus according to claim 24, further comprising reproducing means for reading out said video signals from the recording medium.

29. An apparatus according to claim 28, further comprising display means for selectively displaying an image relating to said video signal, an image relating to said video signal reproduced by said reproducing means and an image relating to said specific image signal expanded by said expanding means.

30. An apparatus according to claim 24, wherein the recording medium includes a magnetic tape and said storage means includes an IC card.

31. A video signal processing apparatus, comprising:

a) first storage means for storing a video signal;

b) extracting means for extracting a specific image signal from said video signal to be stored in said first storage means;

c) compressing means for compressing said specific image signal extracted by said extracting means at a predetermined compressing ratio;

d) second storage means for storing said specific image signal compressed by said compressing means, said first storage means having a capacity larger than that of said second storage means;

e) reading means for reading out the specific image signal from said second storage means; and f) expanding means for expanding the specific image signal read out of said storage means at a predetermined expanding ratio on the basis of the compressing ratio of said compressing means.

32. An apparatus according to claim 31, wherein said second storage means is capable of operating while said first storage means operates.

33. An apparatus according to claim 31, wherein said video signal has a plurality of pictures, each of which comprises a plurality of pixels, said extracting means extracting an image signal corresponding to a picture among said plurality of pictures as said specific image.

34. An apparatus according to claim 33, wherein said compressing means reduces an information amount of said plurality of pixels of said image signal corresponding to said picture extracted by said extracting means.

35. An apparatus according to claim 31, wherein said compressing means includes thin-out means for thinning out numerous picture elements of said specific image signal extracted by said extracting means at a predetermined thin-out rate and for outputting the still image signal thinned out by said thin-out means.

36. An apparatus according to claim 31, further comprising display means for displaying an image corresponding to the specific image signal from said expanding means.

* * * * *

UNITED STATES PATENT AND TRADEMARK OFFICE
CERTIFICATE OF CORRECTION

PATENT NO.   : 5,459,582
DATED        : October 17, 1995
INVENTOR(S)  : Koji Takahashi It is certified that error appears in the above-indentified patent and that said Letters Patent is hereby corrected as shown below:

Col. 1, line 35, delete "to".

Col. 6, line 11, delete "C" and insert -- $C^2$ --.

Col. 9, line 24, after "said" insert -- video camera and said still image from said --.

Col. 10, line 43 after "said" insert -- compressing --.

Signed and Sealed this

Thirtieth Day of July, 1996

Attest:

BRUCE LEHMAN

Attesting Officer

Commissioner of Patents and Trademarks